No. 647,541. Patented Apr. 17, 1900.
E. A. TROMMER.
CHAIN WHEEL LOCKING DEVICE.
(Application filed June 10, 1899.)

(No Model.) 3 Sheets—Sheet 1.

Witnesses.
Alfred M Einshun
Walter Jesse.

Inventor.
E. A. Trommer
by Eustace W Hopkins
atty

No. 647,541. Patented Apr. 17, 1900.
E. A. TROMMER.
CHAIN WHEEL LOCKING DEVICE.
(Application filed June 10, 1899.)
(No Model.) 3 Sheets—Sheet 2.

Witnesses.
Inventor.
E. A. Trommer
by Eustace W. Hopkins
Atty

No. 647,541. Patented Apr. 17, 1900.
E. A. TROMMER.
CHAIN WHEEL LOCKING DEVICE.
(Application filed June 10, 1899.)

(No Model.) 3 Sheets—Sheet 3.

Witnesses.
Inventor
E. A. Trommer

UNITED STATES PATENT OFFICE.

ERNST ALBIN TROMMER, OF STENN, GERMANY.

CHAIN-WHEEL-LOCKING DEVICE.

SPECIFICATION forming part of Letters Patent No. 647,541, dated April 17, 1900.

Application filed June 10, 1899. Serial No. 720,107. (No model.)

*To all whom it may concern:*

Be it known that I, ERNST ALBIN TROMMER, a subject of the Emperor of Germany, residing at Stenn, near Zwickau, Kingdom of Saxony, Empire of Germany, have invented a certain new and useful Improved Chain-Wheel-Locking Device, of which the following is a full, clear, and exact description.

The present invention relates to devices for rendering the driving mechanism of a bicycle or tricycle inoperative when the wheel has been left standing, and thus preventing theft.

The invention relates to that class of mechanism by means of which one or other of the chain-wheels is locked to or unlocked from its shaft, so that the said chain-wheel will be inoperative when the wheel is left standing.

The device consists of the details of construction hereinafter set forth, and particularly pointed out in the claims.

In order to render the present specification more easily intelligible, reference is had to the accompanying drawings, in which similar letters of reference denote similar parts throughout the several views.

Figure 1:
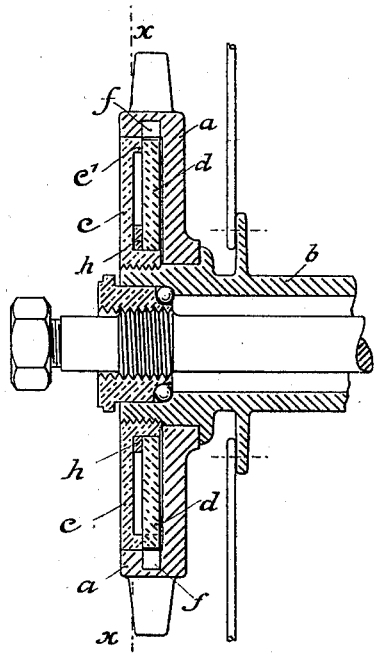
Figure 2:
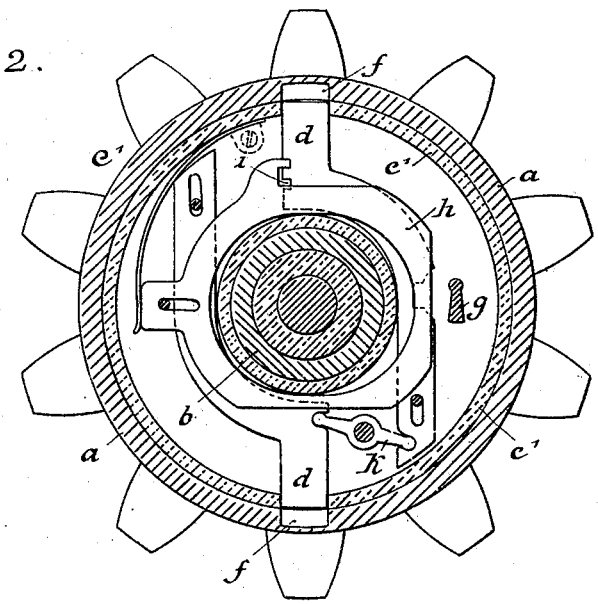
Figure 3:
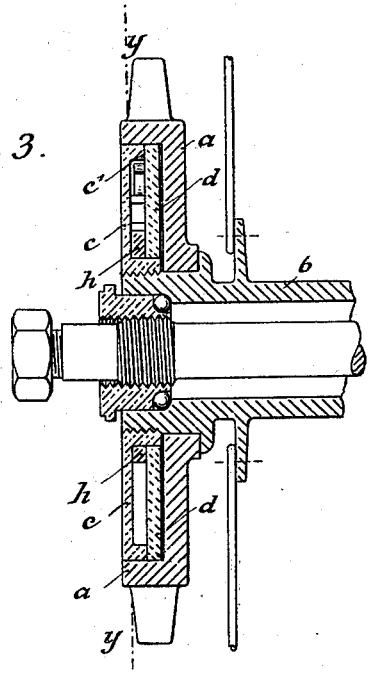
Figure 4:
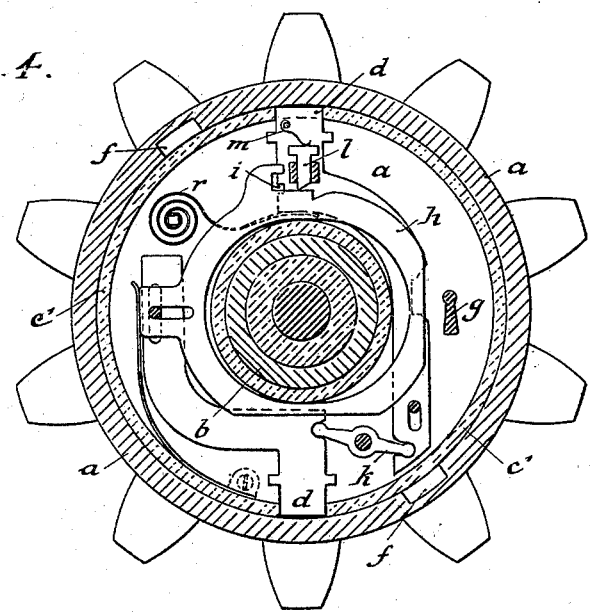
Figure 5:
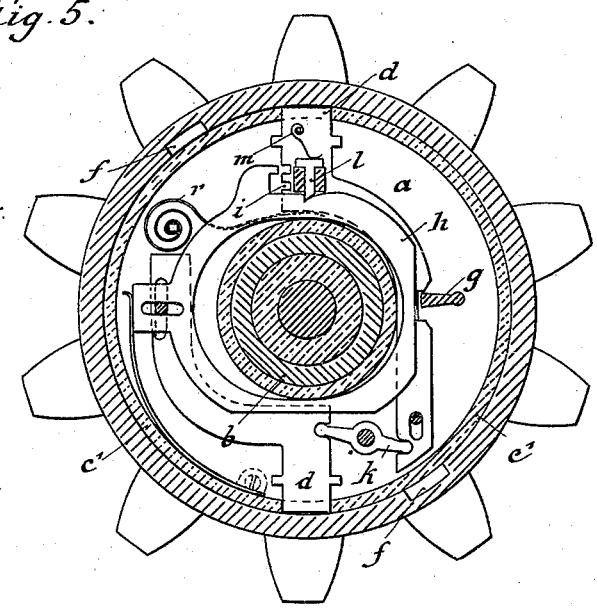
Figure 6:
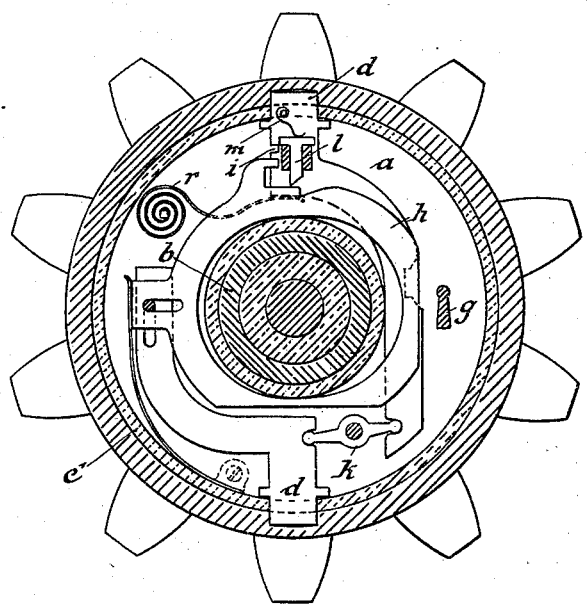

Figure 1 is a vertical cross-section through a chain-wheel carried out according to the invention. Fig. 2 is a section on line $x$ $x$ of Fig. 1. Fig. 3 is a vertical cross-section of a modified form of the device; Fig. 4, a section on line $y$ $y$ of Fig. 3; Fig. 5, a similar section to that of Fig. 4, showing the tumbler disengaged and the bolts in position to snap into the recesses of the chain-wheel when they come around; and Fig. 6 is a similar sectional elevation showing the bolts locked in their recesses by means of the tumbler.

Referring to Figs. 1 and 2, the chain-wheel $a$ is loosely mounted on the sleeve $b$ and has one of its faces recessed to form the lock-casing, a circular cover $c$ being provided to properly fit into the recess, said cover being fast on the driving-sleeve $b$. Within the lock-casing are mounted the bolts $d$ $d$, adapted to pass through recesses of the rim $c'$ of said cover when projected out of the same and engage recesses or sockets $f$, formed in the interior of the rim of the chain-wheel, so that the latter will be locked to the disk $c$ and rotate with the sleeve $b$. Any suitable mechanism may be employed for actuating the bolts $d$ $d$ by means of a key $g$ and tumbler $h$, Fig. 2, in the known manner. In the device shown at Fig. 2 the bolt $d$ is coupled to the lower bolt by means of a pivoted lever $k$, so that when the key pushes back the tumbler $h$ and raises the upper bolt $d$ the lower one will also be projected out, and when the recessed part of the chain-wheel comes around the said bolts will engage the same, as stated. In this form of the invention it is necessary to turn the chain-wheel until the recesses or sockets $f$ $f$ come into position over the bolts, which is sometimes a tedious procedure. In order to avoid this necessity, the construction shown in Figs. 3 to 6 is provided, by means of which the bolts, which are spring-pressed outwardly, may be disengaged from the tumbler by means of the key and then will automatically snap into their sockets in the chain-wheel when the same comes around, being locked therein by the tumbler, as hereinafter set forth.

Referring to Figs. 3 to 6, the bolts $d$ $d$ are spring-pressed outwardly by means of a strong spring $r$, while a downwardly-pressed spring-catch $l$ is provided on the upper bolt $d$, said catch being adapted to engage in a recess of the tumbler $h$ and retain the same in its backward or disengaged position, as shown at Fig. 5. When the parts are in this position, the spring $r$ tends to push the bolts $d$ $d$ against the interior rim of the chain-wheel $a$, said bolts passing through the rim $c'$ of the casing. Consequently as soon as the recesses $f$ come around both bolts will spring into the same, and the chain-wheel will be securely locked to the sleeve $b$. As the bolts move outwardly the catch $l$ will be raised with the upper bolt and withdrawn from the notch of the tumbler $h$, so that the same may again move forward under the influence of its spring and will enter the lower of the two notches $i$ of the bolt $d$, and thus secure the latter in its locked position. When the parts are unlocked, they will be returned to the position shown at Fig. 4, with the catch ready to engage the notch of the tumbler, when the wheel is to be again locked to the sleeve.

It is immaterial in the present invention which of the chain-wheels is provided with the above-described mechanism, as also how many bolts are employed or what particular construction of tumblers, as these may be varied in many ways without departing from the spirit of the present invention.

I claim as my invention—

1. The combination of a chain-wheel loosely mounted on its shaft and having a recessed face, a disk fast to the chain-wheel shaft and forming a cover to said recess, sliding bolts attached to the interior face of said disk and capable of being projected out at the edge of said disk, and recesses in the interior rim of the said chain-wheel into which said bolts may engage and a lock mechanism to retain said bolts in their outward or inward position substantially as described.

2. The combination of a chain-wheel loosely mounted on its shaft and a disk fast on the said shaft, a recess in said chain-wheel face to which the said disk forms the cover, a series of bolts mounted on said disk and adapted to slide outwardly and a tumbler mechanism to lock the same in their outward or inward position, recesses in the interior rim of the chain-wheel in which the said bolts engage and means in connection with one of the said bolts to lock the tumbler back until the bolts have come into engagement with their recesses substantially as described.

3. The combination of a recessed chain-wheel $a$ loosely mounted on its sleeve $b$ and having interior rim-recesses $f$, a disk $c$ fast on the said sleeve and having outwardly-projectionable bolts $d\ d$, a tumbler to lock the bolts in their extreme positions, and a catch $l$ spring-pressed toward the tumbler and mounted on the bolt, said catch being adapted to engage a notch in the tumbler and retain the same out of engagement with the bolts until the recess of the chain-wheel comes around and the bolts are projected outwardly substantially as described.

In witness whereof I have hereunto set my hand in presence of two witnesses.

ERNST ALBIN TROMMER.

Witnesses:
HENRY HASPER,
WOLDEMAR HAUPT.